United States Patent [19]
Danielson et al.

[11] Patent Number: 6,078,470
[45] Date of Patent: Jun. 20, 2000

[54] HEAD SUSPENSION HAVING A MODIFIED DIMPLE DESIGN

[75] Inventors: Reid C. Danielson, Cokato; Thomas F. Heeren; William D. Hovey, both of Hutchinson, all of Minn.

[73] Assignee: Hutchinson Technology, Inc., Hutchinson, Minn.

[21] Appl. No.: 08/997,161

[22] Filed: Dec. 23, 1997

Related U.S. Application Data

[63] Continuation-in-part of application No. 08/673,275, Jun. 28, 1996, abandoned.

[51] Int. Cl.[7] .................................................. G11B 21/21
[52] U.S. Cl. ............................................................ 360/104
[58] Field of Search .................................. 360/104, 103

[56] References Cited

U.S. PATENT DOCUMENTS

| | | | |
|---|---|---|---|
| 4,700,250 | 10/1987 | Kuriyama | 360/104 |
| 4,975,795 | 12/1990 | Spash | 360/104 |
| 5,019,931 | 5/1991 | Ohwe et al. | 360/104 |
| 5,079,660 | 1/1992 | Yumura et al. | 360/104 |
| 5,243,482 | 9/1993 | Yamaguchi et al. | 360/104 |
| 5,446,611 | 8/1995 | Webber | 360/104 |
| 5,473,488 | 12/1995 | Gustafson et al. | 360/104 |
| 5,530,606 | 6/1996 | Baasch et al. | 360/104 |
| 5,636,088 | 6/1997 | Yamamoto et al. | 360/104 |
| 5,638,234 | 6/1997 | Hagen | 360/104 |
| 5,652,684 | 7/1997 | Harrison et al. | 360/104 |
| 5,666,241 | 9/1997 | Summers | 360/104 |

FOREIGN PATENT DOCUMENTS

| | | | |
|---|---|---|---|
| 62-145583 | 6/1987 | Japan | 360/104 |
| 63-90084 | 4/1988 | Japan | 360/104 |
| WO 96/10820 | 4/1996 | WIPO | |

OTHER PUBLICATIONS

The Double Dimple Magnetic Recording Head Suspension and Its Effect on Fly Height Variability, by J.C. Harrison and K.P. Hanrahan, Journal of Tribology, pp. 1–5, 1994.

Primary Examiner—Craig A. Renner
Attorney, Agent, or Firm—Faegre & Benson LLP

[57] ABSTRACT

A magnetic disk drive head suspension of the type having a load beam, a mounting region, and a flexure, includes an improved load point dimple. The load point dimple can be formed in either the load beam for contacting the flexure or the flexure for contacting the load beam. The dimple is characterized by a conical shape, including a conical base portion with generally planar surfaces of the dimple and a spherical tip of the dimple. The tip of the dimple is formed to have a height that is greater than the radius of curvature, and so that the radius of curvature of the tip is less than one-half the width of the dimple as measured at a surface of the material from which the dimple extends. In a preferred embodiment, the radius of curvature of the tip is approximately equal to the protrusion of the dimple above the surface in which the dimple is formed to reduce the change in the high point location of the dimple caused by a deflection angle in the surface in which the dimple is formed.

5 Claims, 5 Drawing Sheets

HEAD SUSPENSION HAVING A MODIFIED DIMPLE DESIGN

REFERENCE TO RELATED APPLICATION

This application is a continuation-in-part of application Ser. No. 08/673,275, filed Jun. 28, 1996, and entitled "Head Suspension Cone Dimple," now abandoned.

TECHNICAL FIELD

The present invention relates to an improved head suspension for use in dynamic storage devices or rigid disk drives. More particularly, the present invention provides specific improvements to a load point dimple in a head suspension.

BACKGROUND OF THE INVENTION

In a magnetic rigid disk storage device, a rotating disk is employed to store information in small magnetized domains strategically located on the disk surface. Rigid disk storage devices typically include a frame to provide attachment points and orientation for other components, and a spindle motor mounted to the frame for rotating the disk. A magnetic read/write head is usually provided as part of a "head slider" to be positioned in close proximity to the rotating disk, which enables the creation and reading of the magnetic domains on the disk. The head slider is supported and properly oriented in relationship to the disk by a head suspension which provides forces and compliances necessary for proper slider operation. As the disk in the storage device rotates beneath the head slider and head suspension, the air above the disk similarly rotates, thus creating an air bearing which acts with an aerodynamic design of the head slider to create a lift force on the head slider. The lift force is counteracted by the head suspension, thus positioning the head slider at a height and alignment above the disk which is referred to as the "fly height."

Typical head suspensions include a load beam and a flexure. The load beam normally includes a mounting region at a proximal end of the load beam for mounting the load beam to an actuator arm of the disk drive, a rigid region, and a spring region between the mounting region and the rigid region for providing a spring force to counteract the aerodynamic lift force acting on the head slider described above. Stiffening rails can also be provided on the rigid region of the load beam. The flexure is located at a distal end of the load beam, and can be either integral with the load beam, or it can be formed as a separate piece which is rigidly mounted on the load beam using conventional means such as spot welds. The flexure typically includes a cantilever region having one or more free ends where the head slider is mounted and thereby supported in read/write orientation with respect to the rotating disk. The free end of the cantilever region is resiliently moveable with respect to the remainder of the flexure (described in greater detail below) in response to the aerodynamic forces generated by the air bearing. Other types of flexures include connecting portions or bridges between a slider mounting portion of the flexure and the remainder of the flexure or load beam, wherein the slider mounting portion of the flexure moves in response to the aerodynamic forces.

Certain types of head suspensions include a generally spherical dimple having a convex surface formed in either the load beam or the cantilever region of the flexure. Such dimples can act as a "load point" between the flexure/head slider and the load beam, and dimples designed to serve this purpose are referred to as "load point" dimples. The load point dimple can be formed in the load beam of a head suspension so that the convex surface of the dimple contacts a surface of the cantilever region of the flexure where the head slider is mounted, or the dimple can be formed in a surface of the cantilever region of the flexure so that its convex surface contacts the load beam. A load point dimple provides clearance between the flexure and the load beam, and serves as a point about which the head slider can gimbal in response to the aerodynamic forces generated by the air bearing. Variations in the rotating disk create fluctuations in these aerodynamic forces. The aerodynamic forces cause the head slider to roll about a longitudinal axis of the head suspension, and to pitch about an axis planar with the head suspension but perpendicular to the longitudinal axis. The load point dimple serves as the pivot point about which the flexure and head slider gimbal in response to the pitch and roll aerodynamic forces.

Disk drives are being designed having smaller disks and closer spacing, and as such, smaller and thinner head suspensions are required. These smaller suspensions have a corresponding smaller load beam and a smaller flexure and slider mounting region in which to form load point dimples. As such, the load point dimples formed in the load beam or flexure are reduced in size. With spherical dimples, however, there is a limit as to how small load point dimples can be. For example, as the radius of a spherical load point dimple is reduced, the clearance between the flexure and the load beam which is necessary for the head slider and flexure to gimbal about the pitch and roll axes is likewise reduced, as compared to dimples having like spherical portions. However, this spacing needs to be sufficient to prevent the flexure/head slider from contacting the load beam as it gimbals.

Moreover, because of the gradual transition of a dimple from the plane of the load beam or flexure where it is formed, spherical dimples can be difficult for optical systems to locate. Optical and vision systems are known to be used to mount and align head sliders to flexures, and it is critical to such systems that they can locate load point dimples in order to ensure proper location and alignment of the head slider. The spherical shape of current dimples does not create a sharply defined profile that is easily sensed by an optical system.

Additionally, certain operations performed during the manufacture of a head suspension can slightly deform the load point dimple's position and attitude, which can be measured or indicated by a deflection angle in the surface in which the spherical load point dimple is formed. These operations specifically include for example forming the stiffening rails on the load beam, which can create a "twist" and/or curvature in the load beam that leads to an out-of-plane condition at the load point dimple, and forming the load point dimple itself, which can create a deflection angle through uneven material deformation. In addition, when under load, the load beam of the head suspension may also deflect, which can create a deflection angle or which can cause a change in a deflection angle already present in surface in which the load point dimple is formed. This deflection angle can shift the contact point between the load beam and the flexure provided by the spherical load point dimple, which may also negatively affect the performance of the head suspension.

SUMMARY OF THE INVENTION

The present invention is an improved magnetic disk drive head suspension including a dimple design which provides a number of advantages over current and prior art head suspension designs. One advantage is that the dimple minimizes the effect on the contact point between the load beam and the flexure caused by a deflection angle in the region of the head suspension where the dimple is formed. Another advantage is that the invention provides a dimple with a well defined contour which can be more easily and accurately located by optical and vision systems that may be used to mount a head slider to a head suspension. Another advantage of the invention is that the dimple accommodates smaller spherical tips while having sufficient height to accommodate the flexure and head slider as it gimbals about the dimple. This smaller tip, in conjunction with a corresponding smaller base of the dimple, allows the dimple to be formed in a smaller flat region of the flexure or load beam, and thus enables the size of the flexure or load beam to be reduced in accord with current trends to reduce the overall size of head suspensions. Yet another advantage is that the smaller spherical tip of the dimple more closely approximates a point contact, and thus allows the head slider and a flexure to efficiently and properly gimbal about the dimple as needed.

The present invention is an improved head suspension and head slider for use in a rigid disk drive, comprising a load beam having an actuator mounting region, a loading region at a distal end of said load beam, a rigid region between said actuator mounting region and said loading region, and a spring region between said actuator mounting region and said rigid region for providing a load force to the head slider in use; a flexure at the distal end of the load beam, the flexure comprising a cantilever region having a slider mounting surface and a free end that is movable during flexure of said cantilever region, said head slider connected to said slider mounting surface and configured to create a lift force acting against said load force in use within a disk drive; a contact surface provided on one of the cantilever region and the head slider that during flexure of the cantilever region and head slider can contact with a portion of the load beam to inhibit the movement of the free end of the flexure; and a load point dimple extending between said loading region of said load beam and said cantilever region of said flexure that extends from a surface of a select region of the head suspension. The dimple has a convex tip portion defined by a radius of curvature. In a general embodiment, the dimple defines a space between the contact surface and the loading region of the load beam, said space and a dimple height each being greater than said radius of curvature, said dimple height being measured including material thicknesses of the select region of the head suspension and of said dimple at said convex tip surface portion. In a specifically preferred embodiment, said radius of curvature of said convex tip portion of said dimple is substantially equal to a protrusion of the dimple, the protrusion being measured from the convex tip surface portion to the surface of the select region of the head suspension from which the dimple extends.

DETAILED DESCRIPTION OF THE INVENTION

Figure 1:
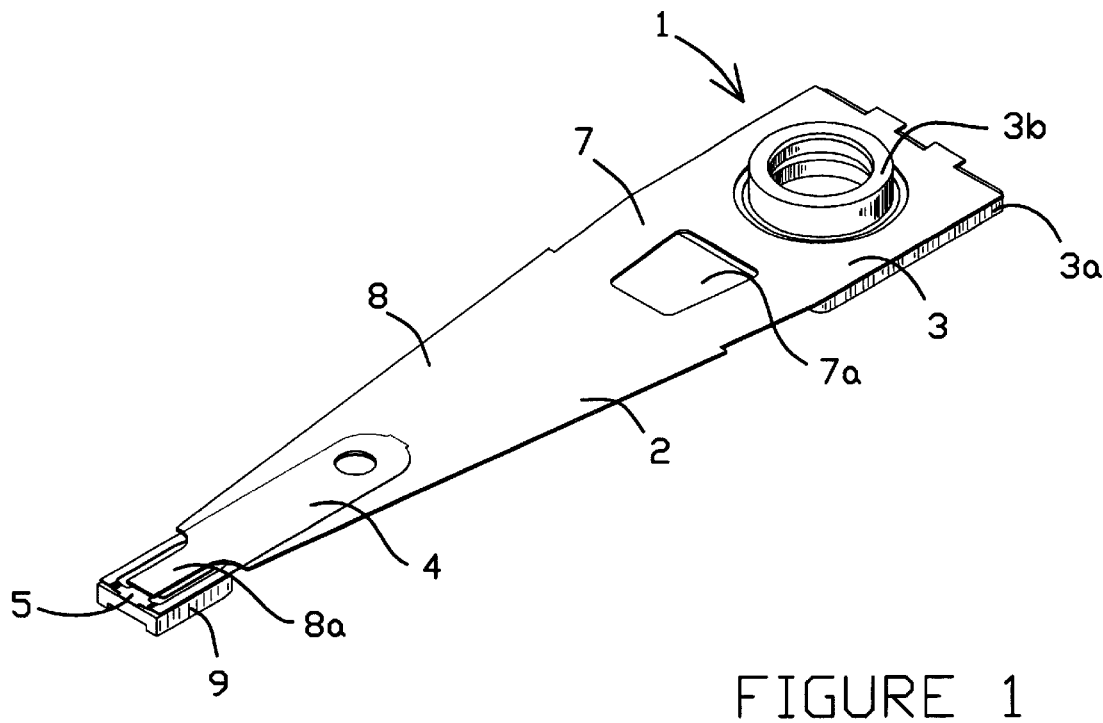
FIG. 1 is an isometric view of a head suspension.
Figure 2:
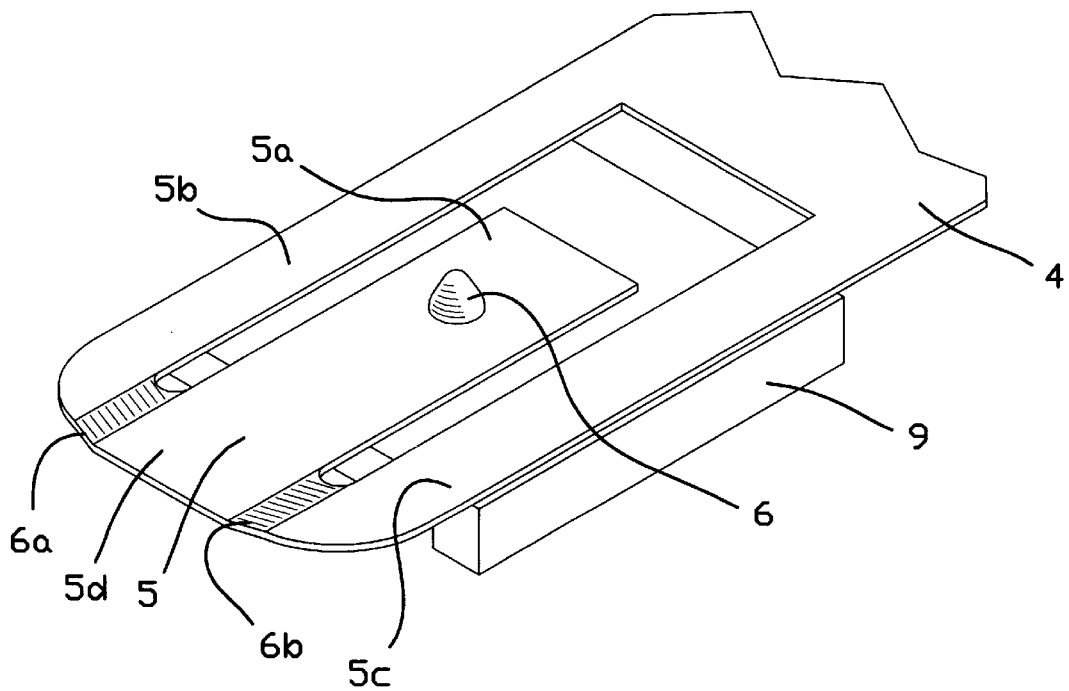
FIG. 2 is a fragmentary isometric view of a flexure of a head suspension in accordance with the present invention having a dimple formed to provide a load point on a cantilevered slider mounting region of the flexure.
Figure 3:
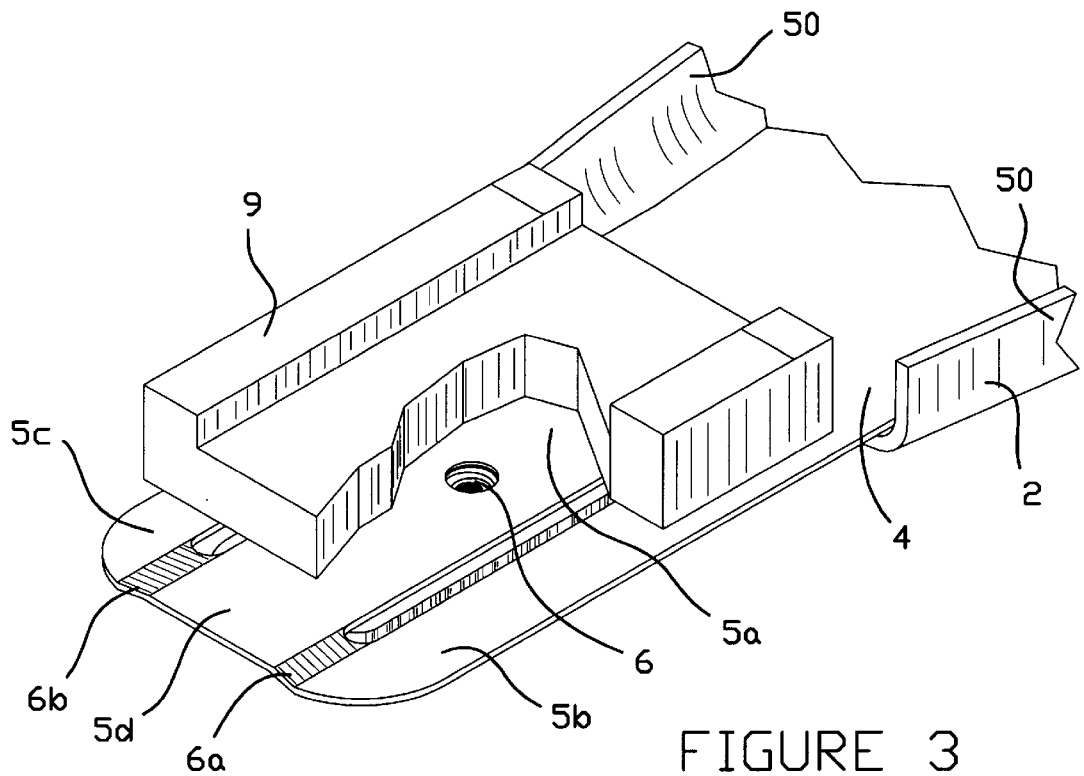
FIG. 3 is a fragmentary isometric view of an inverted head suspension in accordance with the present invention having a dimple formed in a slider mounting region of the flexure of the head suspension.
Figure 4:
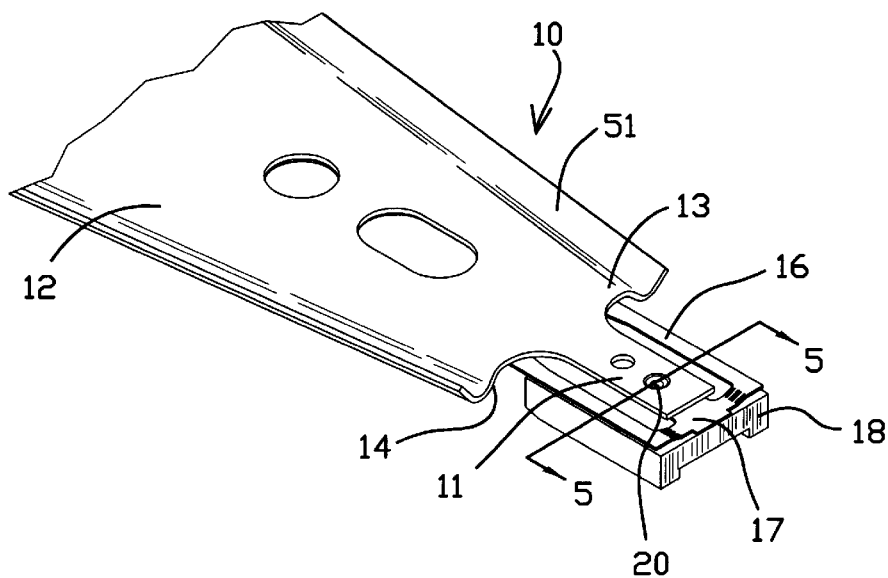
FIG. 4 is a fragmentary isometric view of a head suspension showing a second embodiment of the present invention wherein the dimple is formed in a loading region of a load beam of the head suspension.

Referring now to the drawings, FIGS. 1–5 generally illustrate a head suspension containing an improved load point dimple design. FIGS. 1–3 illustrate a head suspension 1, which includes a load beam 2 and a flexure 4 on a distal end of load beam 2. Load beam 2 is generally comprised of a mounting region 3 on a proximal end of load beam 2, a rigid region 8, and a spring region 7 between mounting region 3 and rigid region 8. Mounting region 3 further includes base plate 3a, secured to load beam 2 by conventional means such as spot welds, and mounting means 3b for mounting head suspension 1 to a rotary actuator of a rigid disk drive (not shown). Mounting means 3b thus enables head suspension 1 to be positioned over an associated disk so the head can read data from or write data to the disk during the normal operation of the disk drive. Spring region 7 generally includes a bend or radius to provide a spring force used to counteract the aerodynamic lift force acting on flexure 4 in use (described in the Background section and in greater detail below). This predetermined spring force supplied by spring region 7 and the counteracting lift force thus define the "fly height" of the head slider 9 of the head suspension 1. Spring region 7 may further include a void region 7a to assist in determining the spring force. Rigid region 8 transfers the spring force from spring region 7 to a load region 8a at the distal end of load beam 2. Load region 8a then transfers the spring force to flexure 4. As perhaps best shown in FIG. 3, load beam 2 may include longitudinal stiffening rails 50 within the rigid region 8 and extending toward head slider 9, as is known. The stiffening rails 50 can be typically formed using a rail punch to bend load beam 2 at its perimeter edge, as is also known. FIG. 4 also shows stiffening rails 51, but formed to extend in the opposite direction (i.e. away from the head slider), as is also known.

Flexure 4 includes a cantilever region 5 having a slider mounting surface to which a head slider 9 is mounted. A free end 5a of the cantilever region is movable vertically in response to pitch and roll movements of the head slider 9 and cantilever region 5. Flexure 4 further includes arms 5b and 5c which extend longitudinally from a proximal end of flexure 4 to a cross piece 5d on a distal end of flexure 4. Offset bends 6a and 6b are located in cross piece 5d of flexure 4 to provide a planar mounting region for head slider 9 and an offset between cantilever region 5 and arms 5b and 5c. As shown in phantom line in FIG. 1, the proximal end of flexure 4 is secured, such as by welding or other conventional means, to rigid region 8 of load beam 2. In the embodiment shown, a dimple 6 is formed in cantilever region 5 of flexure 4, and dimple 6 confronts load region 8a of load beam 2. Dimple 6 provides a specific manner by which the spring force of spring region 7 is transferred from load region 8a of load beam 2 to cantilever region 5 of flexure 4, and furthermore, permits pitch and roll movements of the cantilever region 5 and head slider 9 as described in greater detail below.

Head suspension 1 is designed to align head slider 9 at a proper alignment over the associated rotating disk of the rigid disk drive. Aerodynamic lift forces created by an air bearing generated by the rotating disk act upon head slider 9 and free end 5a of flexure 4. These forces are counteracted and balanced by the cantilever region 5 of flexure 4 and the spring force of the spring region 7 of the load beam 2 as transmitted through load region 8a and load point dimple 6. Head slider 9 can be thus positioned at the "fly height" over the rotating disk, as generally known. Fluctuations in the disk's surface, however, create fluctuations in the air bearing and, hence, in the aerodynamic forces acting on head slider 9. These fluctuations cause head slider 9 and free end 5a to gimbal about a longitudinal roll axis and transverse pitch axis of head suspension 1. Dimple 6, in addition to acting as a point load as described above, provides a displacement between load region 8a of load beam 2 and the cantilever region 5 of flexure 4 and acts as a pivot point about which the head slider 9 and free end 5a of flexure 4 gimbal in response to the pitch and roll aerodynamic forces. In short, dimple 6 defines the movement of head slider 9 and free end 5a, and the displacement it creates between load region 8a and cantilever region 5 allows such movement without contact between a contact surface on either the head slider 9 or arms 5b and 5c of flexure 4 and load beam 2. Specifics of the design of dimple 6 will be described below.

One type of dimple useful in head suspensions are cone shaped dimples, which are specifically described in commonly assigned and copending U.S. patent application Ser. No. 08/673,275, the entire disclosure of which is incorporated here by reference. The present invention is directed to a specific type of dimple for minimizing the effect on the contact point between the load beam and the flexure of a head suspension provided by the dimple that is caused by a deflection angle in the region of the head suspension where the dimple is formed.

Figure 5:
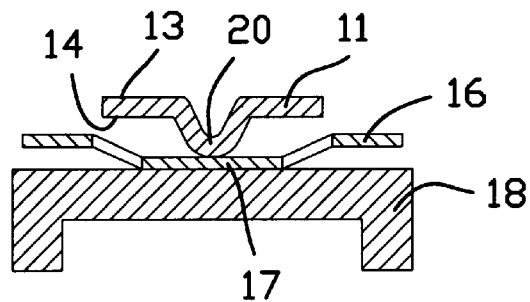
FIG. 5 is a cross-sectional view of the head suspension and dimple shown in FIG. 4 taken along line 5—5 of FIG. 4.

A head suspension 10 in accordance with a second embodiment of the present invention is shown in FIGS. 4 and 5. Similar to head suspension 1 shown in FIGS. 1–3 and described above, head suspension 10 includes load beam 12 and flexure 16 mounted on a distal end of load beam 12. Load beam 12 includes load region 11, and has first and second surfaces 13 and 14, respectively. Flexure 16 includes a cantilever region 17 to which a head slider 18 is mounted. Head slider 18 can thus be positioned above an associated disk (not shown) in a magnetic disk drive for reading and writing data to the disk in the manner described above.

A dimple 20 in accordance with the present invention is formed in load region 11 of load beam 12 for abutting a surface of cantilever region 17 of flexure 16 on the opposite surface from where head slider 18 is mounted. In the present embodiment, dimple 20 is similar to dimple 6 illustrated in FIGS. 1–3 in that it serves as a load point between head slider 18 as coupled to the cantilever region 17 of flexure 16 and load region 11 of load beam 12 for the spring force generated by a spring region of load beam 12. Dimple 20 also enables the head slider 18 and free end of cantilever region 17 of flexure 16 to gimbal about pitch and roll axes of head suspension 10 in response to the aerodynamic forces acting on head slider 18. Dimple 20 is preferably a cone shaped dimple, as described in greater detail below.

Figure 6:
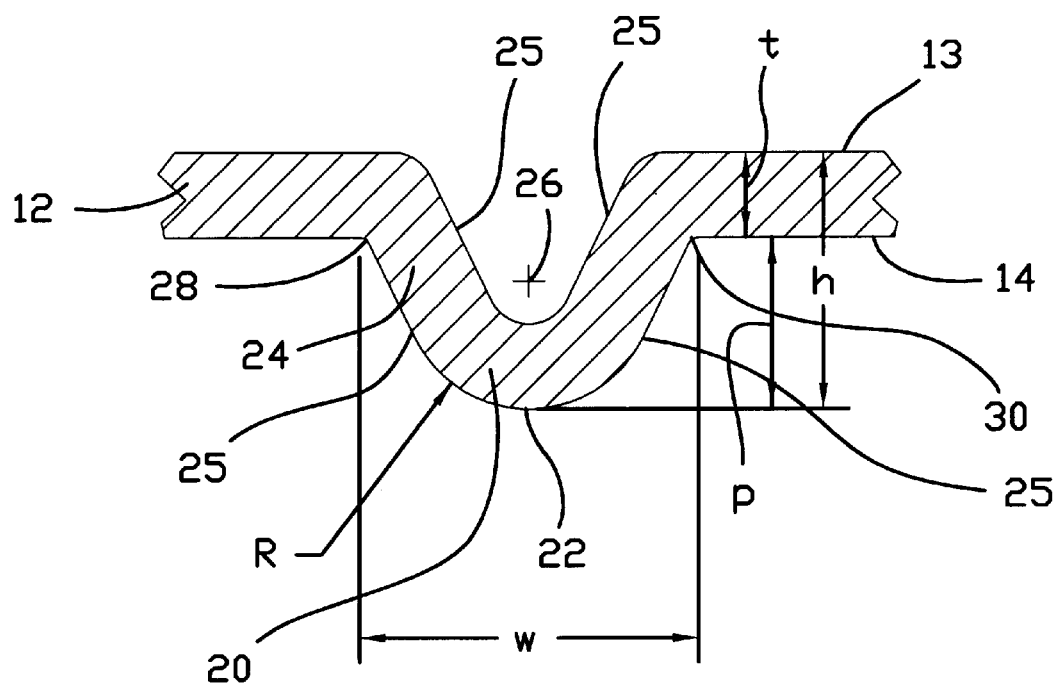
FIG. 6 is a cross-sectional view of a dimple in accordance with the present invention.

Dimple 20 formed in load region 11 of the load beam 12 is shown in greater detail in FIG. 6. Dimple 20 is comprised of tip 22, which is preferably generally spherical in nature, and base 24. In the embodiment shown, base 24 is generally depicted as a truncated cone, although other, non-spherical dimple bases, such as a straight base or a curved base, can be utilized. As described below in greater detail, base 24 is comprised of walls 25, which provide sufficient displacement of dimple 20 from the load beam 12 to allow proper gimballing of the head slider 18. The amount head slider 18 is able to gimbal is limited by the displacement between load beam 12 and a contact surface on either the head slider 18 or the cantilever region 17. The contact surface is that surface of either the head slider or the cantilever region that contacts load beam 12 and inhibits further motion of head slider 18, and is provided on the surface of either the head slider 18 or the cantilever region 17 that extends further in a direction transverse to the longitudinal axis of head suspension 10. In the specific illustrated embodiment, the upper surface of head slider 18 would provide the contact surface because it would contact load beam 12 to inhibit gimbal motion of head slider 18.

The overall dimensions of dimple 20, including the height of the dimple 20, the protrusion of the dimple 20, the spherical radius of tip 22, and the width of dimple 20, are also illustrated in FIG. 6, and are defined as follows. The height h of dimple 20 is measured from first surface 13 of load beam 12 to a maximum displacement of tip 22 at second surface 14 of load beam 12. The protrusion p of dimple 20 represents the displacement of the dimple 20 from the load region 11 of load beam 12. Protrusion p is measured from a generally planar section of second surface 14 to the maximum displacement of tip 22 from second surface 14 (i.e. height h minus the thickness t of the head suspension component in which dimple 20 is formed). The spherical tip 22 is defined by an arc having radius R which is measured from a center point 26 of the arc to second surface 14 of load beam 12 at a point along the arc on the tip 22 of dimple 20. The width w of dimple 20 is defined as the distance between transition points 28 and 30 on second surface 14 where dimple 20 begins to rise from the generally planar second surface 14. The material thickness t of the load region 11 of the load beam 12 in which dimple 20 is formed is also shown in FIG. 6. Heights of 150 micrometers and widths of 250 micrometers are representative dimensions of dimples in accordance with the present invention. Typical dimple heights of dimples in accordance with the present invention range from 100 to 210 micrometers. Typical dimple widths of dimples range from 200 to 450 micrometers. Typical material thickness ranges from 18 to 77 micrometers.

The overall geometry of dimple 20 is designed to provide a dimple with a sharp profile and sufficient gimbal clearances for the flexure and head slider while reducing the overall width w of dimple 20 and the radius R of the spherical tip 22 of dimple 20. Reducing the width of dimples and the radius of spherical tips of dimples is advantageous because it allows dimples to be formed in smaller areas, and because it creates a dimple which more closely approximates a true point contact. However, as detailed in the Background section, simply reducing the radius of a prior art spherical dimple also reduces the maximum displacement of the dimple from the plane of the flexure or load beam where the dimple is formed. As a practical matter, the maximum displacement of a spherical dimple is about equivalent to the radius of the dimple, and as this radius is reduced, the displacement consequently is reduced. This reduced displacement creates a less well-defined profile of the dimple as the dimple profile begins to merge with the plane of the flexure or the load beam. Optical systems are currently used both to locate dimples when positioning head sliders and for measuring the position of dimples to ensure they are formed in the proper location on the head suspension, and these systems benefit from a sharply defined dimple profile which is more visible. The unclearly defined profiles of reduced radius spherical dimples are more difficult for optical systems to locate, which consequently makes it more difficult to align the head slider at the fly height and to measure the location of the dimple. More significantly, however, the reduced displacement caused by the reduced radius of a spherical dimple decreases the gap between the load beam and the contact surface on the cantilever region of the flexure or the head slider. This reduces the clearances allowed for the head slider and flexure to gimbal about the pitch and roll axes. In addition, the amount the radius of a spherical dimple can be reduced is limited by the amount the radius of the tip of a punch used to form dimples can be effectively reduced.

In order to provide smaller radius dimples with better defined profiles and sufficient heights, truncated cone base 24 comprising walls 25 is used in conjunction with a spherical dimple to create cone shaped dimple 20. Walls 25 of truncated cone base 24 raise the spherical tip 22 of dimple 20 above the plane of load beam 12 (i.e., above the first or second surface 13 or 14 of load beam 12). Walls 25 of base 24 of dimple 20 are formed so as to provide sufficient displacement between the cantilever region 17 of flexure 16 and load region 11 of load beam 12 to allow head slider 18 to gimbal. Walls 25 further create a sharply defined profile of dimple 20, thus allowing optical systems to more precisely locate and measure the position of dimple 20, and ultimately leading to more accurate alignment of the head slider at the fly height. Walls 25 also accommodate limitations in the amount that the spherical tip of a punch used to form dimple 20 can be reduced (described in greater detail below). In short, dimple 20 comprising walls 25 of base 24 and tip 22 allow a smaller radius R to be used for spherical tip 22.

In order to achieve these improvements in the dimple, when forming dimple 20 radius R of tip 22 is chosen to be less than about the height h of dimple 20 and less than the displacement between the load region 11 of load beam 12 and the contact surface on the head slider or the cantilever region 17. Furthermore, radius R can preferably be chosen to be less than about one-half the width of dimple 20. By choosing radius R in such a manner, the center point 26 of tip 22 is maintained at a minimum above first surface 13 of load beam 12, and preferably at or above the second surface 14 of load beam 12. This ensures that a base 24 with walls 25 will be created for positioning the spherical tip 22 at a sufficient height, with the height not limited by the radius of the tip 22. As radius R of spherical tip 22 is reduced, walls 25 of base 24 can be increased in length in order to maintain the center point 26 above the first surface 13 or the second surface 14 of load beam 12, and to maintain sufficient displacement between the contact surface and load beam 12 to allow proper gimballing.

Figure 7:
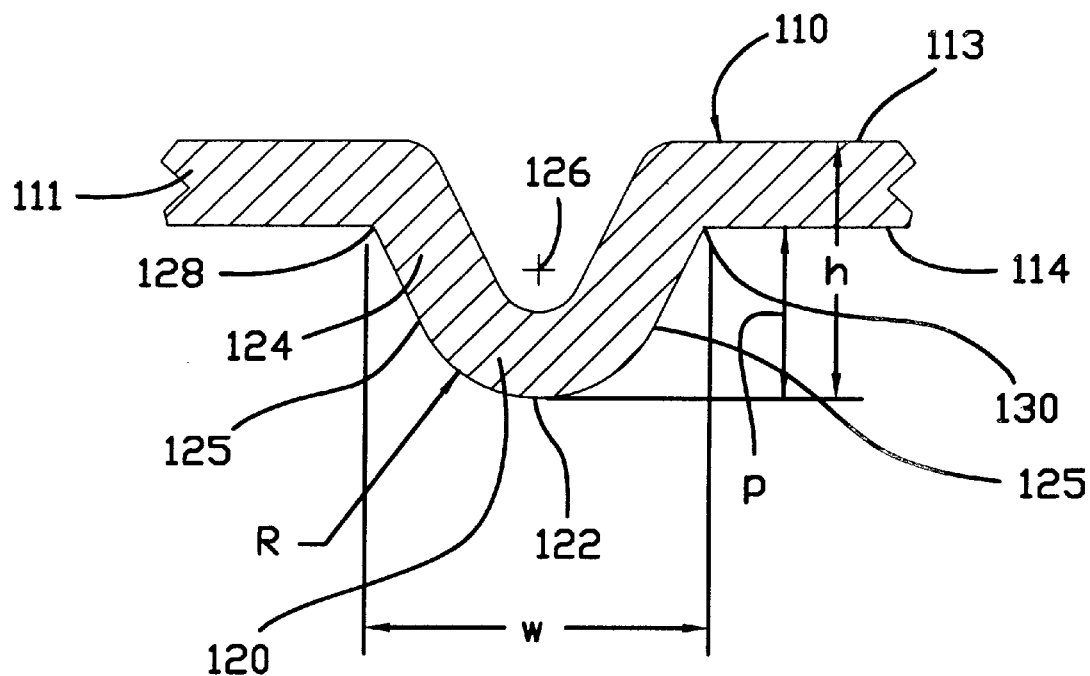
FIG. 7 is cross-sectional view of an alternative embodiment of a dimple in accordance with the present invention.

FIG. 7 illustrates a specific embodiment 120 of a dimple in accordance with the dimples described above formed in a region 111 of a head suspension, but which has significant benefits in addition to those described above. Dimple 120 can be formed in either a loading region of the head suspension load beam or in a cantilever region of a head suspension flexure to extend between the load beam and the cantilever region. Dimple 120 thus defines a space between a contact surface on the cantilever region or on a head slider attached to the cantilever region and the load beam. Dimple 120 includes a spherical tip 122 having a radius R and a base 124, and extends from a generally planar surface 114 of region 111. The height h of dimple 120 is measured from the maximum displacement of tip 122 to the level of a surface 113 of region 111 opposite surface 114. Protrusion p of dimple 120 is measured from a generally planar portion of surface 114 to the maximum displacement of tip 122 from surface 114. The width w of dimple 120 is defined as the distance between transition points 128 and 130 on second surface 114 where dimple 120 begins to rise from the generally planar second surface 114.

Base 124 is preferably a truncated cone having sloping walls 125 to position spherical tip 122 at or above the plane of region 111 and to provide sufficient displacement between the load beam and the flexure for proper gimballing of a head slider. Walls 125 further create a sharply defined profile of dimple 120 to facilitate locating and measuring the position of dimple 120 with an optical system. Walls 125 of base 124 can preferably be constructed so that radius R of tip 122 is less than about one-half the width w of dimple 120 for reasons similar to those discussed above.

Figure 8:
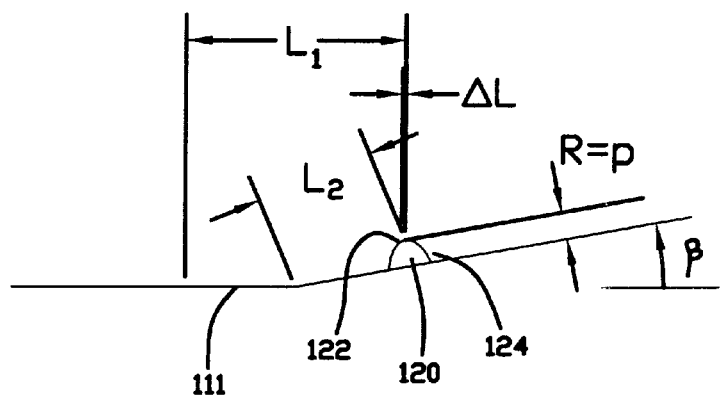
FIG. 8 is a schematic view of a dimple in accordance with the present invention in an out-of-flat condition.

In the embodiment shown in FIG. 7, dimple 120 is formed so that the radius R of dimple 120 is substantially equal to protrusion p of dimple 120 (i.e. center point 126 is positioned approximately at the same level as surface 114). By this construction, dimple 120 has particular advantages over conventional spherical dimples in addition to those previously discussed. As described in the Background section, the position and attitude of dimple 120 can be slightly displaced from the optimum or intended position and attitude due to forming operations during the manufacture of head suspension 110. For example, forming the stiffening rails on a head suspension load beam or forming the dimple 120 itself can create an angular displacement or error in the region in which dimple 120 is formed. This angular displacement or error is an indicator of an "out-of-plane" condition in region 111 as compared to the remainder of the head suspension, and can be measured. This indicator is referred to as the deflection angle, and is schematically shown in FIG. 8 as angle β. With conventional dimples, an out-of-flat condition in region 111 can create a substantial offset in the position of the point of maximum displacement of dimple 120 above surface 114, which is the point of contact between the dimple 120 and either the load region or the cantilever region of the head suspension (depending on the region in which the dimple 120 is formed). Dimple 120 having a tip radius R that is approximately equal to the protrusion p of the dimple 120 minimizes the offset created by the deflection angle, and thus makes dimple 120 less sensitive to out-of-flat conditions.

FIG. 8 schematically illustrates how dimple 120 is less sensitive to out-of-flat conditions in the region 111 in which dimple 120 is formed. Deflection angle β indicating an out-of-flat condition in the region 111 in which dimple 120 is created is shown as measured from a horizontal plane to region 111. The distance from a reference datum to the centerline of a punch or socket used to form dimple 120 is shown as $L_1$, and the distance from the origin of the deflection angle β to the centerline of dimple 120 is shown as $L_2$. The reference datum $L_1$ can be chosen to correspond to structure on the head suspension, such as an aperture formed in the load beam and/or flexure formed to facilitate alignment of the flexure and load beam. In the situation where $L_2$ is greater than $L_1$, $L_2$ is set equal to the distance $L_1$. The change ΔL in the point of contact between dimple 120 and the load region or cantilever region of the head suspension as compared to the optimum or designed point of contact includes two primary components, one resulting from the distance between the origin of the deflection angle and one resulting from the difference between the radius and the projection of the dimple. Using known mathematic equations, the change ΔL is then defined as:

$$\Delta L = -L_2(1-\cos(\beta)) + (R-p)\sin(\beta)$$

As a result of the relationship between radius R and protrusion p in the equation above, when R is equal to p, the last term of the equation has a value of zero. The sensitivity of the position of the contact point of dimple 120 to deflection angle β is thus reduced when the radius R of tip 122 is equal to the protrusion p of dimple 120. In other words, the offset ΔL between the actual high point of dimple 120 and the intended high point of dimple 120 (i.e. the high point in the absence of a deflection angle β) is reduced when the radius R of tip 122 is equal to protrusion p of dimple 120. In this manner, the dynamic performance of the head suspension can be improved in that the load is transferred to the flexure of the head suspension at a location that is closer to the intended location, and the gimbal point for the head slider is also closer to the intended location.

Figure 9:
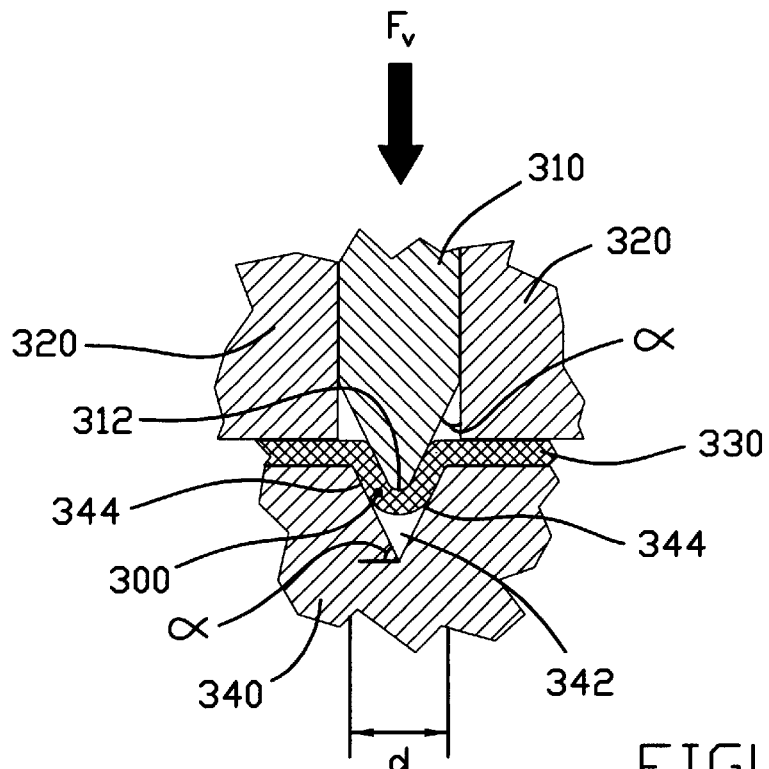
FIG. 9 is a cross-sectional view of tooling used to form a dimple in accordance with the present invention.
Figure 10:
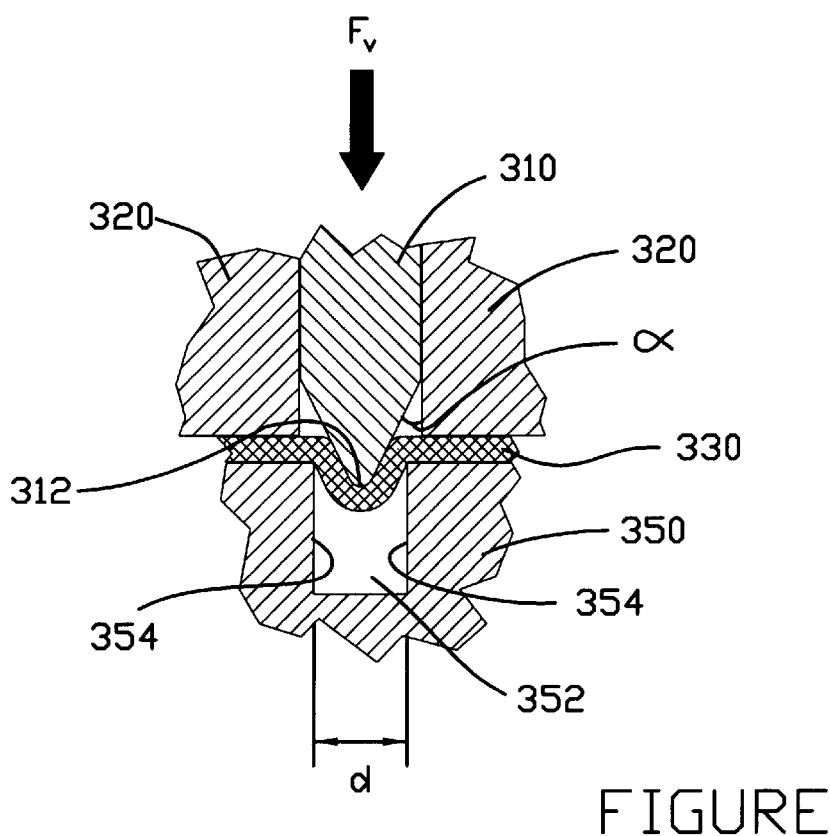
FIG. 10 is a cross-sectional view of alternative tooling used to form a dimple in accordance with the present invention.

FIGS. 9 and 10 depict a method for forming dimples in accordance with the present invention. In broadest terms, dimple 300 is formed by providing a dimple punch 310, a punch guide 320, a sheet of material 330 where the dimple is to be formed, and punch socket 340, and engaging the dimple punch 310 with material 330 to form dimple 300 that is preferably cone shaped. For the purposes of example, material 330 will be described as a flexure of a head suspension as described above and shown in FIGS. 1–3.

Dimple punch 310 can be a dimple punch wherein tip 312 is shaped to be spherical in nature with a radius of curvature corresponding to the desired radius R of the tip of dimple 300 minus the material thickness of the region in which dimple 300 is formed. The radius of spherical tip 312 preferably ranges from 25 to 150 micrometers. A representative value of the radius of spherical tip 312 is 25 micrometers, which can produce a radius of the spherical tip of dimple 300 of 77 micrometers. Dimple punch 310 is further shaped to taper from spherical tip 312 at a desired angle, α. This taper angle α varies depending on the radius R that is chosen for the tip and dimple radius and the desired width and height of dimple 300. For example, as radius R is reduced, the taper angle α can be correspondingly reduced in order to maintain a sufficient height of dimple 300 to provide adequate gimballing clearances while maintaining the same, or smaller, dimple width. Taper angles preferably range from 20 degrees to 65 degrees and a taper angle of 40 degrees can be used for a tip and dimple radius of 77 microns.

Punch socket 340 is formed having a diameter d and a valley 342 in which dimple 300 is formed. Diameter d substantially corresponds to the width w (as illustrated in FIG. 6) of dimple 300, and thus can preferably be chosen to be at least twice the radius R of the dimple tip radius. In a specific example, diameter d can be about 260 microns for a radius R of 77 microns and a taper angle of 40 degrees. As depicted in FIG. 9, punch socket 340 can be formed such that valley 342 has walls 344 that taper at an angle that coincides with the taper angle α of dimple punch 310. Such a punch socket is referred to as a "conical socket." Alternatively, as depicted in FIG. 10, a punch socket 350 wherein valley 352 has vertical walls 354 can be used to form dimple 300. Punch socket 350 is referred to as a "through socket."

Dimple 300 is formed by placing flexure 330 between punch guide 320 and dimple socket 340. A vertical force $F_v$ is applied to dimple punch 310, thereby causing dimple punch 310 to move in a downward stroke. Dimple punch 310 engages flexure 330 above valley 342 of punch socket 340, and plastically deforms flexure 330 as punch 310 continues its downward stroke. Flexure 330 can be formed to be coincident with tip 312 of punch 310 and, as shown in FIG. 9, with the tapered walls of valley 342 of conical socket 340. Alternatively, as illustrated in FIG. 10, when through socket 350 is used in forming dimple 300, flexure 330 is formed to be coincident with tip 312 of punch 310 but not coincident with valley 352 of socket 350. The downward stroke is continued for a predetermined distance which ultimately determines the height and protrusion of dimple 300. As described above, a height of 150 micrometers can be used for a dimple having a tip radius of 77 micrometers and a taper angle of 40 degrees. After this predetermined distance is reached, a vertical displacement in the opposite direction of $F_v$ is applied to punch dimple 310, thus moving it in an upward stroke and disengaging punch 310 from dimple 300 and material 330.

Although the present invention has been described with reference to preferred embodiments, those skilled in the art will recognize that changes may be made in form and detail without departing from the spirit and scope of the invention.

What is claimed is:

1. A head suspension and head slider for use in a rigid disk drive comprising:

a load beam having an actuator mounting region, a loading region at a distal end of said load beam, a rigid region between said actuator mounting region and said loading region, and a spring region between said actuator mounting region and said rigid region for providing a load force to the head slider in use;

a flexure at the distal end of the load beam, the flexure comprising a cantilever region having a slider mounting surface and a free end that is movable during flexure of said cantilever region, said head slider connected to said slider mounting surface and configured to create a lift force acting against said load force in use within a disk drive;

a contact surface provided on one of the cantilever region and the head slider that during flexure of the cantilever region can contact with a portion of the load beam to inhibit the movement of the free end of the flexure; and a load point dimple between said loading region of said load beam and said cantilever region of said flexure that extends from a surface of a select region of the head suspension, said dimple having a convex tip surface portion defined by a radius of curvature, said radius of curvature being substantially equal to a protrusion of the dimple and less than one half a dimple width at the surface of said select region from which said dimple extends, the protrusion being measured from the convex tip surface portion to the surface of the select region of the head suspension from which the dimple extends.

2. The head suspension of claim 1 wherein the convex tip surface portion of said dimple includes a spherical surface.

3. The head suspension of claim 1 wherein a sloping side wall of said dimple between said convex tip surface portion and said surface of said select region substantially forms a truncated cone.

4. The head suspension of claim 1 wherein said load point dimple is formed in said loading region of said load beam for contacting said cantilever region of said flexure.

5. The head suspension of claim 1 wherein said load point dimple is formed in said cantilever region of said flexure for contacting said loading region of said load beam.

* * * * *